United States Patent [19]

Ueda et al.

[11] Patent Number: 4,979,096
[45] Date of Patent: Dec. 18, 1990

[54] MULTIPROCESSOR SYSTEM

[75] Inventors: Hirotada Ueda, Kokubunji; Kanji Kato, Tokorozawa; Hitoshi Matsushima, Tachikawa, all of Japan

[73] Assignee: Hitachi Ltd., Japan

[21] Appl. No.: 15,380

[22] Filed: Feb. 17, 1987

[30] Foreign Application Priority Data

Mar. 8, 1986 [JP] Japan .................................. 61-51236

[51] Int. Cl.⁵ ..................... G06F 13/00; G06F 13/37; G06F 13/38
[52] U.S. Cl. ................................ 364/200; 364/244.4; 364/240.5; 364/238.8; 364/260
[58] Field of Search ... 364/200 MS File, 900 MS File; 382/41, 42

[56] References Cited

U.S. PATENT DOCUMENTS

| | | | |
|---|---|---|---|
| 4,149,242 | 4/1979 | Pirz | 364/200 |
| 4,257,100 | 3/1981 | Syrbe et al. | 364/200 |
| 4,491,915 | 1/1985 | Forquer et al. | 364/200 |
| 4,524,455 | 6/1985 | Holsztynski et al. | 364/200 |
| 4,550,437 | 10/1985 | Kobayashi et al. | 364/200 X |
| 4,663,706 | 5/1987 | Allen et al. | 364/200 |

FOREIGN PATENT DOCUMENTS

| | | |
|---|---|---|
| 14926 | 9/1980 | European Pat. Off. |
| 147857 | 7/1985 | European Pat. Off. |
| 2137847 | 10/1984 | United Kingdom |

Primary Examiner—Eddie P. Chan

[57] ABSTRACT

A multiprocessor system includes processor units connected physically in one-dimensional fashion along a ring bus located at the node of each processor element and associated local memory, so that various system operating modes are possible. The ring bus is used for inter-processor data transfer, with the address and read/write signals to each local memory being supplied from the processor element (by the program). Sychronization between the data flow on the ring bus and the processor operation is made automatic by the innovated method of inter-processor connection, which includes flag latches in the ring bus, whereby the system accomplishes extremely high-speed processing.

13 Claims, 10 Drawing Sheets

FIG. 4

| KIND OF MODE (42-1) | MODE SIGNAL 12 (42-2) | | | IO8(i)/IO8(i) (43) | IO8(i-1) (44) | OUTPUT (45) |
|---|---|---|---|---|---|---|
| | b2 | b1 | b0 | | | |
| HOLD | 0 | 0 | 0 | 0 | — | 0 |
| HOLD | 0 | 0 | 0 | — | — | — |
| RESET | 0 | 0 | — | — | — | 0 |
| SET | 0 | — | 0 | — | — | — |
| COPY 0 | — | 0 | 0 | 0 | 0 | 0 |
| COPY 0 | — | 0 | 0 | — | — | 0 |
| COPY 0 | — | 0 | — | — | — | — |
| COPY 1 | — | 0 | — | — | 0 | — |
| COPY 1 | — | 0 | — | 0 | 0 | 0 |
| COPY 1 | — | 0 | — | — | — | — |
| UNDEFINED | OTHERS | | | — | — | 0 |

FIG. 6

| KIND OF OPERATION MODE | OUTLINE OF PROCESS |
|---|---|
| MULTIPLE DATA MODE | DIFFERENT INPUT IMAGES ARE ASSIGNED TO N PROCESSOR UNITS FOR INDIVIDUAL PROCESS |
| DIVIDED AREA MODE | INPUT IMAGE IS DIVIDED INTO m×n PARTIAL IMAGE SECTIONS FOR PROCESS BY m×n PROCESSOR UNITS |
| DIVIDED FUNCTION MODE | DIFFERENT FUNCTIONS ARE ASSIGNED TO N PROCESSOR UNITS FOR PROCESS OF IDENTICAL IMAGE |
| PIPELINE MODE | DIFFERENT FUNCTIONS ARE ASSIGNED TO N PROCESSOR UNITS FOR SEQUENTIAL TRANSFER OF PROCESSING RERULT |

$S_{ij}$: PARTIAL IMAGE SECTIONS ($1 \leq i \leq m$, $1 \leq j \leq n$)

▨ OVRLAPPED AREA
(ABNORMAL PARTS AFTER PROCESS)

▩ NORMAL DATA TO BE TRANSFERRED

MULTIPROCESSOR SYSTEM

BACKGROUND OF THE INVENTION

This invention relates to a multiprocessor system intended for fast information processing, and particularly to a multiprocessor system suitable for fast, parallel processing of two-dimensional data such as image data.

Image processing often requires immense computational power which cannot be provided by a single processor, and therefore various image processors of the multiprocessor type have been proposed. Conventional multiprocessor systems, which are simple in structure, have aimed to implement preprocessing such as filtering where ultra high-speed computation is required. In such cases, many processors equal in number to the pixels of an image, each processor merely having a 1-bit processing ability, are operated in parallel to achieve the speed-up of the overall process (called "complete parallel processing type"), as presented under the title of "An LSI Adaptive Array Processor" in the 1982 Annual conference of International Solid State Circuits. The preprocessing by the multiple processors is followed by the main processing including image feature extraction and structural analysis, which have been commited to programs of a general-purpose microcomputer (having high-level arithmetic/logic instructions) at the sacrifice of the processing speed, or handed over to custom-designed hardware devices oriented to specific system purposes.

However, as the application field of image processors expands, the required process becomes more sophisticated. Speed-up of only preprocessing no longer makes sense, and a processor which covers more comprehensive processes is now desired. The prior U.S. patent application Ser. No. 687,159 filed by the same applicant (corresponding to JP-A-60-140456 laid open on July 25, 1985) has proposed a data processing system capable of fast and comprehensive processing through the ring-like connection of several processors with high level functions.

When a multiprocessor system is intended to enhance the computational ability, the inter-processor communication and inter-processor data exchange increase the system overhead, resulting in a lower ability than expected. In addition to this general problem, image processing necessitates fast data transfer between adjacent processors in a two-dimensional arrangement. For example, the above-mentioned multiprocessor system of complete parallel processing type has all processors connected such that each one may effect data transfer with processors adjoining in the eight directions. On this account, the circuit scale is large, and because of the limited processor function of 1-bit arithmetic/logic operation and 1-bit data transfer at once, the system oriented to fast preprocessing is not suited for high-level image processing.

The above-mentioned multi-processor system coupled by a ring bus of the preceding patent application was intended to preclude the circuit complexity, but because of its embodying control system, in which the controller checks the status of the ring bus and processors each time before issuing commands sequentially to the processors and ring bus controller in order to ensure a synchronism between data flowing on the ring bus and the processor operation, the system could not provide a satisfactory high-speed performance.

The above control system needs the following six steps of operation in transferring image data from processor 1 to processor N.

Step 1: The controller issues a control command to processor 1 to fetch data from the memory.

Step 2: Processor 1 notifies the controller that it has fetched data from the memory.

Step 3: The controller issues a control command to the ring bus controller to shift the bus data n times.

Step 4: The ring bus controller notifies the controller that it has shifted the data n times.

Step 5: The controller issues a control command to processor N to store the transferred data in its memory.

Step 6: Processor N notifies the controller that it has stored the data in its memory.

These information transactions between the controller and the processors and ring bus controller have been a significant system overhead of the prior control system.

SUMMARY OF THE INVENTION

An object of this invention is to provide an economical, practical and yet ultra high performance image processor configured using a plurality of processor units with innovated connection being made among processor elements.

The inventive system employs a 1-dimensional ring bus connection for the processor units. The reason for this connecting scheme is for less wiring among processor units, less switching of buffers and simple overall structure, and it is suited for the compactness of the hardware system, while providing a large transfer data width (16-bit word). Even though the physical connection is one-dimensional, it can be treated logically as an arbitrary two-dimensional arrangement (e.g., 8-by-8, 4-by-16, 2-by-32); namely it provides higher latitude of processor arrangement (as compared with the eight-directional connection).

By disposition of the ring bus at the node of each processor element and associated local memory, the system readily realizes extensive operating modes. The ring bus is dedicated to data transfer and is freed from the address and read/write control signal delivery to the local memory (they are supplied from the processor element by programming), thereby eliminating hardware components such as the address counter with the intention of a reduced circuit scale, and furthermore synchronization between the data flow on the ring bus and the processor operation is made automatically by the innovated connection among processors, whereby extremely fast processing is made possible.

More specifically, the inventive inter-processor connection eliminates the need for an information transaction between the controller and processors for synchronizing the image data flow on the ring bus with the processor operation, as has been the case of the prior control scheme. For example, the preceding example of data transfer from processor 1 to processor N by the prior control system takes six steps of operation, whereas the inventive system, in which the above steps 1, 2, 5 and 6 are automatic through the innovated connection among processors, necessitates only steps 3 and 4 and preloading of programs in the processors, whereby speed-up of processing can be achieved.

BRIEF DESCRIPTION OF THE DRAWINGS

FIG. 4 is a table showing the contents of the flag controller ROM 26 in FIG. 2.

FIG. 6 is a table listing the operating modes and their operations.

DESCRIPTION OF THE PREFERRED EMBODIMENTS

An embodiment of this invention will now be described.

Figure 1:
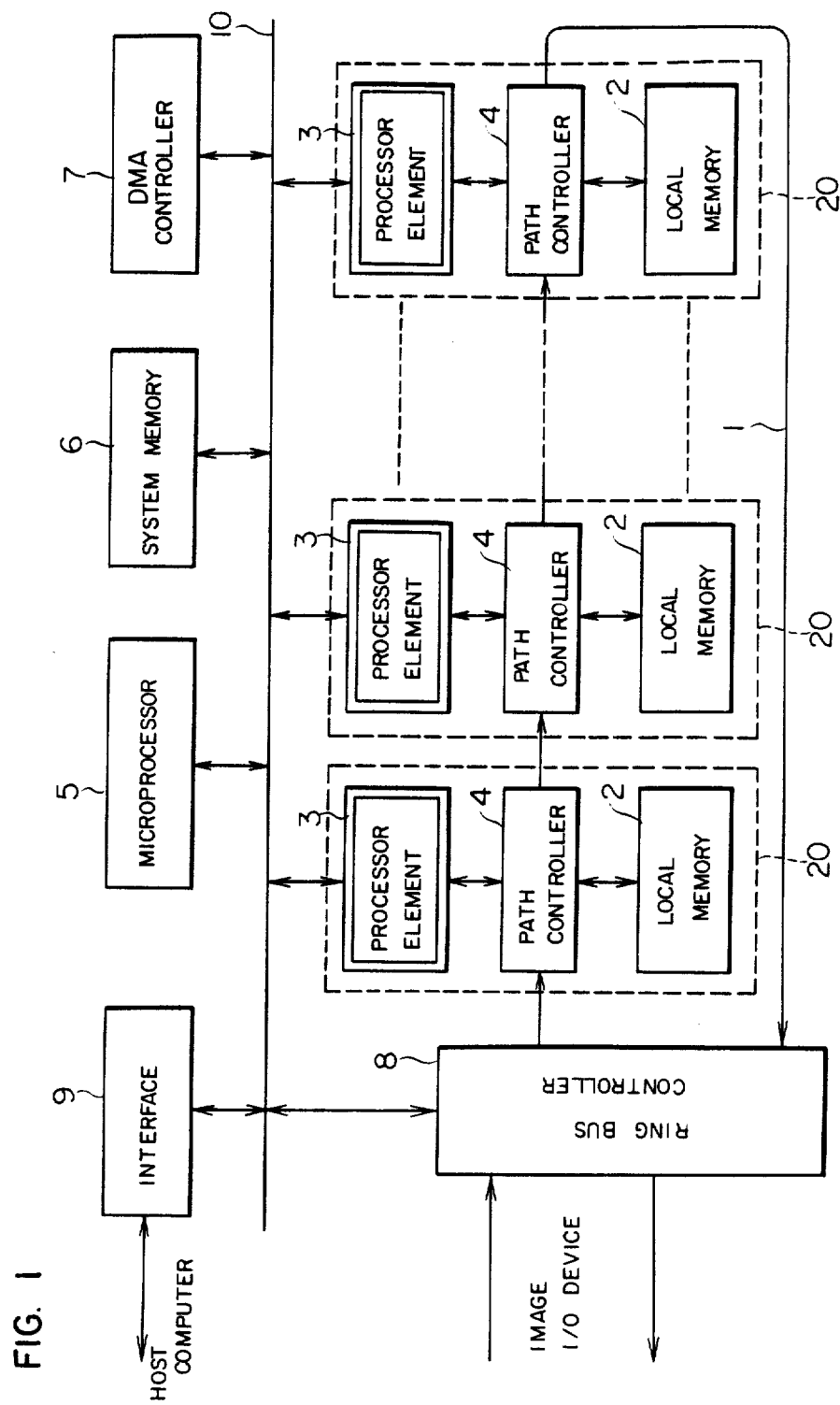
FIG. 1 is a block diagram showing the overall system arrangement according to this invention.

In FIG. 1 showing the overall system arrangement of this invention, reference number 1 denotes a ring bus, on which data from an external image input unit (not shown) and data to an external image output unit (not shown) flow. Local memories 2 are to store data flowing on the ring bus 1. Processor elements 3 implement image data processing by executing a program. Path controllers 4, each connected between a processor element 3 and a local memory 2, are also connected serially in a shift register fashion.

Each processor element 3, path controller 4 and local memory 2 in combination constitute a processor unit 20 (shown by the dashed block), and several processor units 20 are arrayed.

A microprocessor 5 is to control the overall system, and it is connected to a host computer (not shown) by way of a system bus 10 and input/output interface 9. A system memory 6 supplies programs to the processor elements 3 over the system bus 10. A DMA-controller 7 controls the program transfer from the system memory 6 to the processor elements 3. A ring bus controller 8 controls data transfer on the ring bus 1, and it is connected to an external image input/output unit (not shown).

In this embodiment, 64 processor units 20 have the same internal circuit arrangement, and they will be referred to with parenthesized position numbers, e.g., 20(1), 20(2), etc., when necessary, or the position number will not be appended when a generic processor unit is being referred to.

The ring bus 1 is also used for fast image data transaction with an external device such as a printer. Although 64 processor units 20 are used in this embodiment, the number of processor units can be selected arbitrarily depending on the required performance.

As shown in FIG. 1, image data to be processed is fed to the local memory 2 of each processor unit 20 through the ring bus 1. Each processor element 3 incorporates an associated program memory, to which a pertinent program is loaded from the system memory 6 under control of the DMA-controller 7. The DMA-controller 7 can also supply the same program to all processor elements 3. The microprocessor 5 controls the initiation and termination of a program on an address basis in each processor element, and each processor element 3 can issue an interrupt request to the microprocessor 5.

Figure 2:
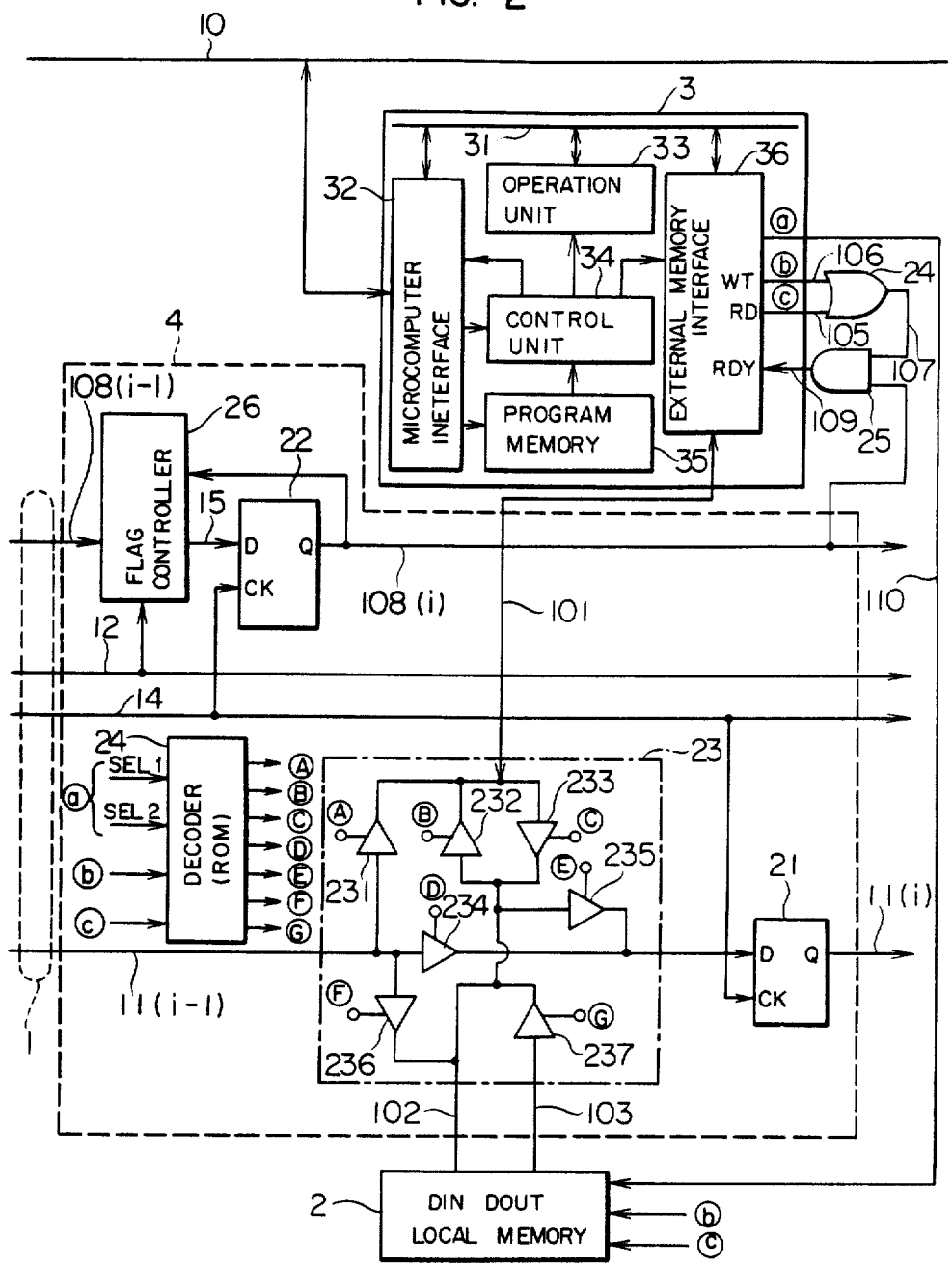
FIG. 2 is a block diagram showing in detail the processor unit 20 in FIG. 1.

Next, the processor unit 20 shown in FIG. 1 will be described in detail with reference to FIG. 2. The processor element 3 consists of an internal bus 31, a microprocessor interface 32, an arithmetic logic unit (ALU) 33, a control unit 34, a program memory 35, and an external memory interface 36. The microprocessor interface 32 in connection with the system bus 10 has a major role of loading a program into the program memory 35 and delivering commands, e.g., RUN, HALT, etc., issued by the microprocessor 5 to the control unit 34.

The control unit 34 executes the program by fetching microcodes sequentially from the program memory 35 and ron trolling the ALU 33 and external memory interface 36. The DMA-controller 7 loads a program from the system memory 6 into the program memory 35.

The external memory interface 36 mainly implements the signal transaction with the external memory, and it also operates to output the address signal to the address bus 110, transfer data to and from the data bus 101 and generate the read (RD) and write (WT) strobe signals. RDY strobe is given by the external memory for synchronizing the read/write operation of the processor element 3 with the access operation of the external memory. The external memory interface 36 extends the read/write operation until it receives the RDY strobe signal. In this embodiment, the RDY strobe is used to synchronize the read/write operation with the arrival of data transferred over the ring bus 1.

The path controller 4 consists of a data latch 21, a flag latch 22, a data bus controller 23, a decoder 24, and a flag controller 26. The data latch 21 and flag latch 22 are flip-flops. The data bus controller 23 is made up of seven tri-state control gates 231–237, with their enabled or disabled states being determined by the output of the decoder 24. Symbols Ⓐ, Ⓑ, Ⓒ, Ⓓ, Ⓔ, Ⓕ and Ⓖ in the figure denote terminals of the tri-state control gates. The decoder 24 is a ROM device, which receives the read (RD) signal 105 and write (WT) signal 106 provided by the processor element 3 and the high-order two bits (SEL1, SEL2) of the address bus 110, and selects by combination of these signals one of combinational enabled/disabled states for the seven tri-state control gates 231–237 in the data bus controller 23.

Figure 3:
FIG. 3 is a table listing the control status of the tri-state control gates and the corresponding data transfer directions of the data bus controller 23 in FIG. 2.

FIG. 3 shows the possible combinations of the above signals (SEL1, SEL2, WT, RD) and the corresponding states of the tri-state control gates 231–237 and resulting data transfer directions. With the combination of the signals SEL1, SEL2, WT and RD to be 0000, only the tri-state control gate 234 is enabled With the signal combination 0010, the control gates 233 and 234 are enabled. With the signal combination 0001, the control gates 232, 234 and 237 are enabled. With the signal combination 0110, the control gates 234 and 236 are enabled. With the signal combination 0101, the control gates 231 and 234 are enabled With the signal combination 1010, the control gates 233, 235 and 236 are enabled. With the signal combination 1001, the control gates 231, 235 and 237 are enabled Other combinations of the signals cause all tri-state control gates to be disabled. Depending on each signal combination, data is transferred in the direction shown by the arrow in the rightmost column of the table, in which symbol PE denotes the processor element 3, LM is the local memory 2, and DL is the data latch 21.

The flag controller 26 is a ROM device, which receives the mode signal 12 sent from the ring bus controller 8, the state 108($i-1$) of the preceding flag latch and its own state 108($i$) in the previous shift cycle, end produces a signal 15 which determines the state of the flag latch 22.

FIG. 4 lists the possible inputs and outputs of the flag controller ROM 26. Column 42 gives types of mode, which include HOLD mode, RESET mode, SET mode, COPY-0 rode and COPY-1 mode. These five modes are defined by the mode signal 12 which consists of three bits (b2, b1, b0). Column 43 contains the state 108($i$) of its own flag latch in the previous shift cycle, column 44 contains the state 108($i-1$) of the preceding flag latch, and column 45 contains the output 15 of the flag controller 26. Symbol "-" used in the table signifies that the signal state (0 or 1) does not matter.

The HOLD mode is defined by the mode signal in state 000, in which the flag latch 22 has its state left unchanged irrespective of the state 108($i-1$) of the preceding flag latch 22. The RESET mode is defined by the mode signal 12 in state 001, in which the flag controller 26 provides a "0" output to reset the flag latch 22. The SET mode is defined by the mode signal 12 in state 010, in which the flag controller 26 provides a "1" signal to set the flag latch 22. The COPY-0 mode is defined by the mode signal in state 100, in which the flag controller 26 provides a "0" output to reset the flag latch 22 only when the state 108($i-1$) of the preceding flag latch is "0", otherwise the flag latch 22 is left unchanged. The COPY-1 mode is defined by the mode signal in state 101, in which the flag controller 26 provides a "1" output to the set the flag latch 22 only when the state 108($i-1$) of the preceding flag latch is "1", otherwise the flag latch 22 is left unchanged. With the mode signal having a state other than those mentioned above, the flag controller 26 retains a "0" output.

Next, the operation of the circuit shown in FIG. 2 will be described. The path controller 4 incorporates two latches (data latch 21 and flag latch 22) each connected with the counterparts of the adjacent processor unit 20 in a shift register connection so that a ring bus is formed in conjunction with the ring bus controller 8. The data latch 21 and flag latch 22 operate as part of shift registers to circulate data on the ring bus in response to the shift clock 14.

The data flow will be described using FIG. 2. 16-bit data sent from the preceding data latch 21 is received by the data bus controller 23. The data bus controller 23 is connected with the data bus 101 of the processor element 3 and the data buses 102 and 103 of the local memory 2. These buses have a 16-bit width. The data bus controller 23 is followed by the data latch 21 associated to this processor unit 20, from which data is passed on to the next processor unit.

The ring bus 1 has a sole role of data transfer, and the address and read/write signals to the local memory 2 are supplied from the processor element 3 (in accordance with the program), whereby hardware components such as the address counter are eliminated with the intention of reducing the circuit scale.

Next, the function of the flag latch 22 will be described. As shown in FIG. 2, the flag latch 22 has its output 108 applied to the AND gate 25 with the signal 107 which is the result of the OR logic by the OR gate 24 for the read (RD) 105 and write (WT) 106 signals from the processor element 3, and the output of the AND gate 25 is given to the ready (RDY) terminal 109 of the processor element 109. On this account, the processor element 3 implements the read/write operation only when the flag latch 22 is set to "1", and the operation of the processor element 3 is held until the flag latch 22 is set. Namely, the flag latch 22 is set at a timing when data 11 flowing on the ring bus 1 arrives at the data bus controller 22 in the intended processor unit 3, thereby synchronizing the read/write operation of the processor element 3 with the data flow. The flag latch 22 has its status determined by the flag controller 26 depending on the mode signal 12 provided by the ring bus controller 8, the state 108($i-1$) of the preceding flag latch and the state 108($i$) of itself in the previous shift cycle, as mentioned previously. Consequently, synchronization between the data flow on the ring bus and the processor operation, which has been the cause of retardation of processing in the method of the preceding patent application, is now made automatic by the present invention, resulting in a significant time saving in processing.

Figure 5:
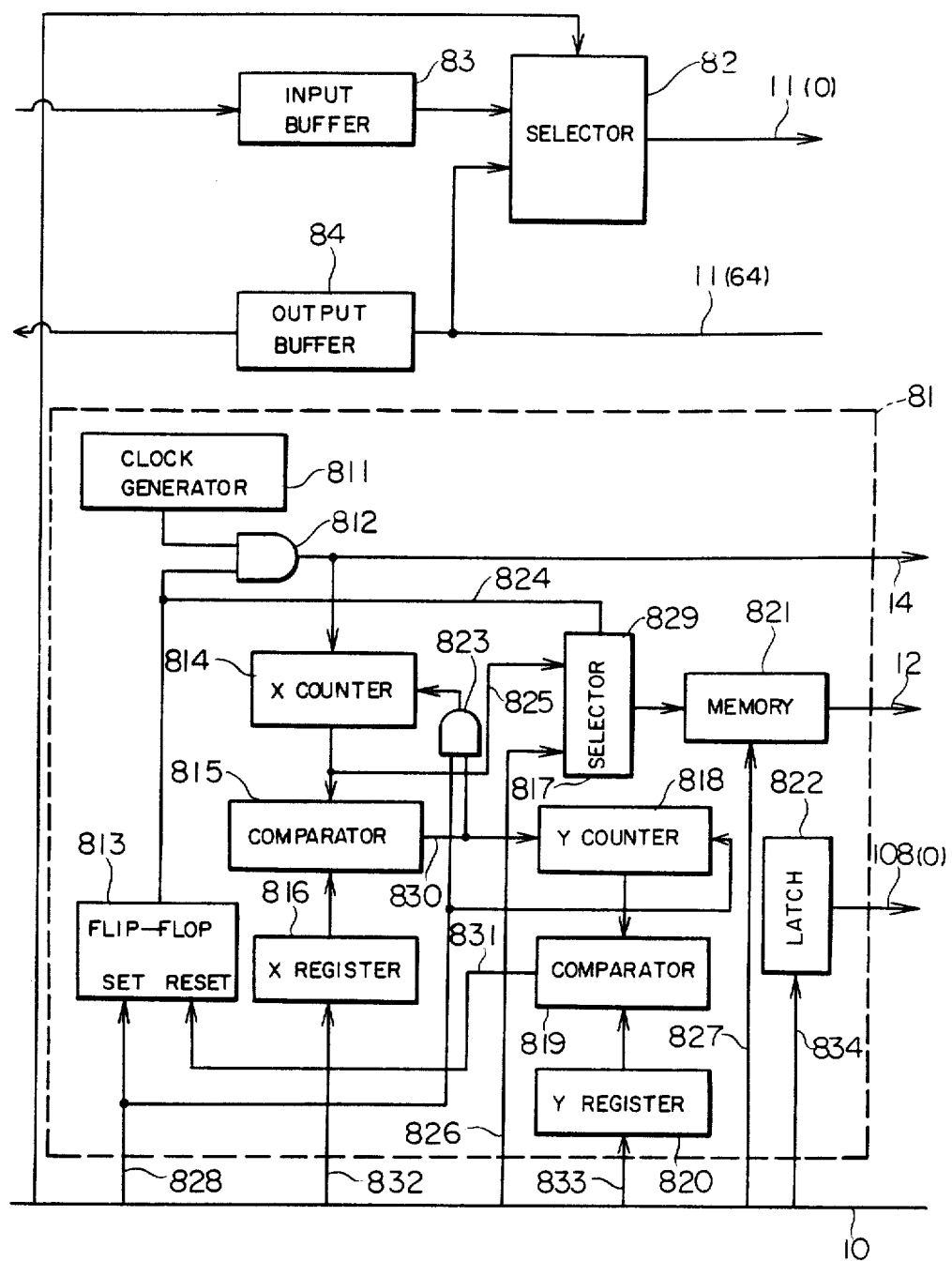
FIG. 5 is a block diagram showing in detail the ring bus controller 8 in FIG. 1.

Next, the ring bus controller 8 in FIG. 1 will be described in detail with reference to FIG. 5. The ring bus controller 8 consists of a shift controller 81, a selector 82, an input buffer 83 and an output buffer 84. Normally, the selector 82 is set so that it provides an output 11(0) which is derived from ring bus data 11(64). For entering image data, the selector 82 is switched by the signal on the system bus 10, and incoming data received by way of the input buffer is passed on to the ring bus as the ring bus data 11(0). For the image data output, such as to the external printer (not shown), the ring bus data 11(64) is sent out by way of the output buffer 84.

The shift controller 81 consists of a clock generator 811, an AND gate 812, a flip-flop 813, an X-counter 814, a comparator 815, an X-register 816, an OR gate 823, a selector 817, a Y-counter 818, comparator 819, a Y-register 820, a memory 821, and a latch 822. The clock generator 811 and flip-flop 813 have their outputs connected to the AND gate 812 so that the clock produced by the clock generator 811 is validated as a shift clock 14 when the flip-flop 813 is in a set state. The memory 821 is loaded in advance with a sequential variation pattern of the mode signal 12 supplied from the microprocessor 5 over the system bus 10 and signal line 827 when the flip-flop 813 is in a reset state.

When the flip-flop 813 is set by the signal sent from the microprocessor 5 over the system bus 10 and signal line 828, the X-counter 814 starts to count clock pulses provided by the clock generator 811, and the selector 817 decodes the output 825 of the X-counter 814 to produce an address signal 829 to the memory 821. Accordingly, the mode signal 12 sent out of the shift controller 81 varies in accordance with the contents of the X-counter 814.

The count of the X-counter 814 is compared with the setting of the X-register 816 by the comparator 815, which produces a coincidence pulse 830 when both inputs are equal. The coincidence pulse 830 is used to reset the X-counter 814 by way of the OR gate 823, and is also received by the Y-counter 818, which starts to count the coincidence pulse 830. The X-counter 814 starts to count clock pulses again. The count of the Y-counter 818 is compared with the setting of the Y-register 820 by the counter 819, which produces a pulse 831 in response to the equality of both inputs and resets the flip-flop 813.

The values held in the X-register 816 and Y-register 820 determine the dimensions of the field in the X and Y directions, and these values are set by the microprocessor 5 via the respective signal lines 832 and 833 before the commencement of data transfer onto the ring bus 1. The latch 822 is used to hold the initial value for the flag latch 22 provided by the microprocessor 5 over the system bus 10 and signal line 834.

Since the present invention is intended for image processing using a plurality of processor units 20, it is important to carry out parallel processings efficiently by distributing image data and processing programs in some form to the processor units 20. As a versatile image processor for smoothly carrying out extensive image process algorithms, the embodiment of this invention has four operating modes. All types of image data transfer which become necessary in correspondence to these four operating modes are accomplished by selective connections of the seven tri-state control gates 231-237 in the bus controller 23. The four operating modes and their processes are summarized in FIG. 6.

Multiple data mode is used for a large quantity of image data which can be distributed among the processors, in such a case of implementing the same process sequentially for the whole data. This mode eliminates the need of data transaction among the processors, resulting in a less system overhead. A precaution to be taken is idling caused by the contention of ring bus 1 which supplies image data to the local memories 2 when more than one processor unit 20 terminate processes at the same time (Actually, the process ending time is made random among the processors and no significant system overhead will result.)

Divided area mode is used for processing a frame of image data in a short time. Because of image division into partial sections to be distributed among the processors 20 for processing (see FIG. 7), a process for joining the process results on the boundaries of partial sections may be required in some cases at completion of divisional processes. This extra process inherent in the divided area mode seems to create a significant system overhead when used carelessly, but the inventive arrangement makes such additional time expense minimal, as will be described in detail later.

Divided function mode is suitable for the process algorithm in which a processing function is shared among processor units 20 for sampling numerous characteristic values on a frame of image or collating it with many dictionaries. In this case, the amount of data produced as a process result is far smaller than the amount of original image data, and therefore a final process for collecting process results distributed among the processors will be too small to call it a system overhead.

Pipeline mode is suitable for the case where image data is generated rather slowly, such as the image signal generation by a scanner, the image data can be processed on a realtime basis, and the process can be split into several sequential functional steps, e.g., a filtering process precedes, which is followed by a profile tracing process, and finally a vectorizing process takes place.

Figure 7:
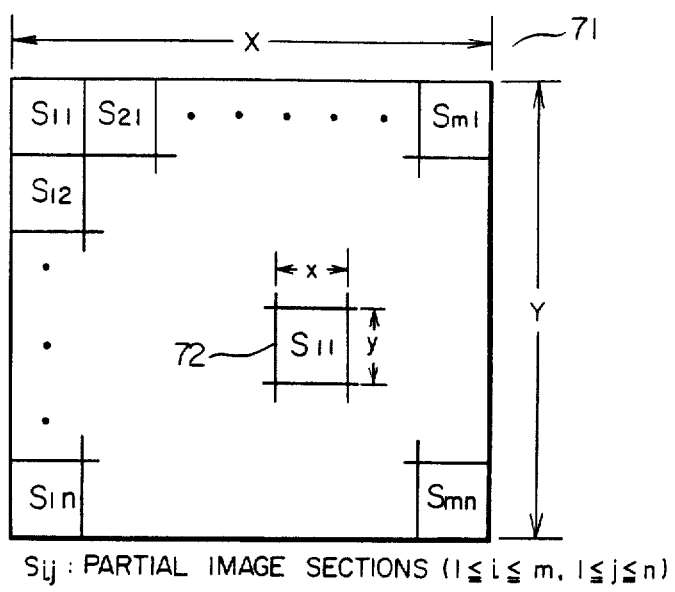
FIG. 7 is a diagram showing the segmentation of an image with X-by-Y dimensions into partial image sections Sij consisting of x-by-y pixels.
Figure 8:
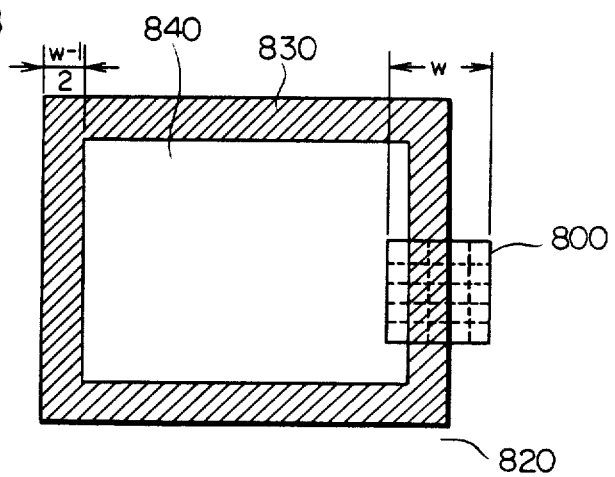
FIG. 8 is a diagram showing a normal portion and abnormal portion created as a result of a filtering process.
Figure 9A:
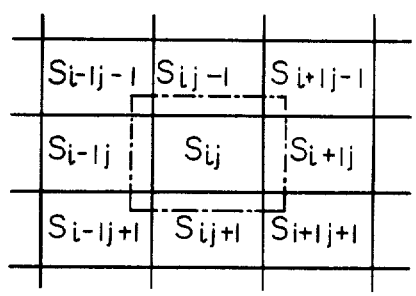
FIGS. 9A and 9B are diagrams showing overlapped partial image sections.

The divided area mode involves inherent matters as will be detailed in the following. In this mode, an image 71 with dimensions of X-by-Y pixels is divided into partial image sections Sij 72 each made up of x-by-y pixels, as shown in FIG. 7. The partial image sections Sij of m-by-n in number are processed separately by processor units 20 of m-by-n in number. Accordingly, when the intended process is pixel-independent, such as concentration conversion, it can be sped up by m-by-n folds as compared with processing using a single processor unit 20. However, in another case such as the filtering process where the result of process for one piXel is determined from data of pixels included in a mask area centered by the subject pixel, the situation is rather complicated Specifically, as shown in FIG. 8, a pixel located at an outer section of an image 820 has its associated mask area 810 jutting out of the image, and it cannot be processed correctly (such a portion 830 will be termed "abnormal portion" in contrast to a normal portion 840). Although this is a problem common to general image processing, for the process specifically in the divided area mode in which partial image sections needs to be joined thereafter to restore the original image size, creation of an abnormal portion in an outer section (boundary section) of a partial image is fatally inconvenient. To avoid such a matter, it is necessary for the divided area mode to prepare overlapped partial images as shown in FIG. 9A. In addition, the abnormal portion created in the outer section of a partial image has its width (half the mask area width subtracted by one) increased cumulatively by the repetition of filtering, and this must be prevented by replacement of the abnormal portion with an image portion processed normally at each (or at every several repetition of) filtering process.

The replacement for abnormal portions is accomplished as follows As shown in FIG. 10A, when abnormal portions created by the filtering process are confronted with adjoining partial images, they are found to be located within the normally processed areas of the respective partial images On this account, the replacement can be done correctly by using the normal image data possessed by the processor units adjacent in the eight directions to the subject partial image.

Figure 9B:
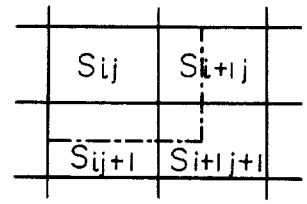

By the way, it is possible to implement the replacement of abnormal portions by transferring image data among processor units in three directions only, instead of the eight directions mentioned above. The previous description is based, for the sake of easy understanding, on the method of writing a processed pixel at the center of the mask area so that the image position does not change before and after the filtering process. Otherwise, if it is allowed that the whole image is shifted as a result of process with respect to the original position of the image before the process, a process-resultant pixel may be written at the top left corner of the mask area, as shown in FIG. 10B, in which case abnormal portions are confined in the right-hand and lower sections and therefore data transfer needed for the replacement for these is only in three directions as shown. In this case, the overlapped area is made as shown in FIG. 9B. The widths of the abnormal portions are equal to those of the mask area subtracted by one, while the number of pixels of the whole abnormal portion is the same as the previous case. The former type will be termed "8-directional transfer", and the latter type "3-directional transfer".

Next, the method of controlling the ring bus 1 will be described for the case of the divided area mode as an example.

Figure 11:
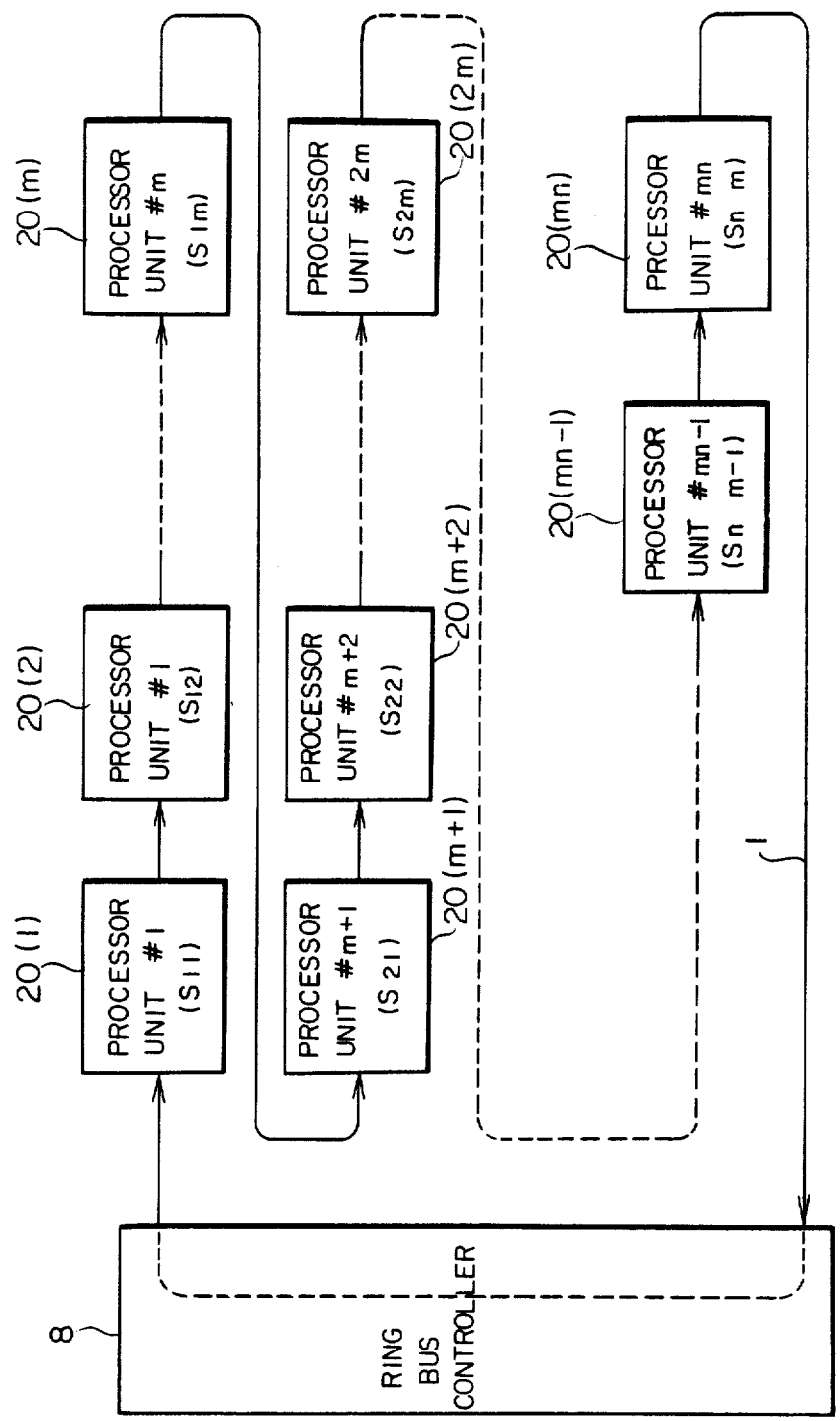
FIG. 11 is a block diagram showing the connection among the processor units.

As mentioned earlier, the inventive multiprocessor system includes a plurality of processor units 20 connected physically in one-dimensional manner along the ring bus 1. When the system is operated in divided area mode of two-dimension as shown in FIG. 7, the processor units 20 are made correspondence to a logical two-dimensional (m-by-n) array The processor units 20 are interconnected as shown in FIG. 11, and the operation of each processor unit is timed to the raster scanning of image display. The processor units 20 have a simple correspondence between the logical two-dimensional distance and the physical one-dimensional distance For example, a data transfer to the right in the logical two-dimensional space is a shift operation on the ring bus 1, a downward data transfer is m-time shift operations, and an upper-leftward data transfer is mn-m-1 time shift operations. These rules are valid for any combination of processor units.

Figure 12:
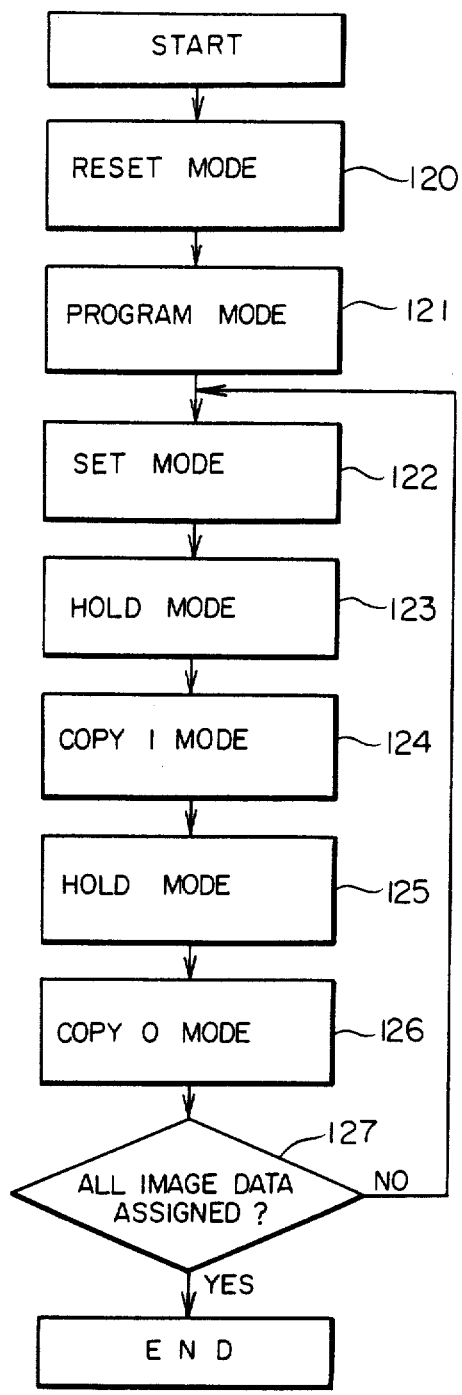
FIG. 12 is a flowchart showing the procedure of transfer in divided area mode for partial image data having an overlapped area.

The following describes two examples for the ring bus control method First, the system operation in divided area mode for transferring data of partial images including overlapped portions will be described with reference to FIG. 12. It is assumed that image data in the form of raster scanning is sent from an external data source by way of the ring bus controller 8 in FIG. 1.

Initially, in step 120, a mode signal 12 indicative of reset mode is issued so that the flag latches 22 in all processor units 20 are reset. In the subsequent step 121, and processor elements 3 are loaded with programs each stores data supplied over the ring bus 1 in the local memory consecutively by addressing the memory on an incremental basis from the top of the image data area, and the programs are initiated.

In step 122, a mode signal 12 indicative of RESET mode is issued so that flag latch 22(1) of only processor unit 3(1) is set, and image data is fed through the ring bus controller 8 onto the ring bus 1. The image data which is shifted from one data latch 21 to another sequentially is written only in local memory 2(1) of the first processor unit 3(1). During the above operation, the mode signal 12 is made HOLD mode in step 123 so that the contents of all flag latches 22 are kept unchanged.

In step 124, the mode signal 12 is altered to COPY-1 mode at a timing when the first pixel data to be received by processor unit 20(2) reaches it, and the signal is restored to HOLD mode in step 125. The COPY-1 mode signifies that flag latch 22($i$) is set to "1" only when the preceding flag latch 22($i-1$) contains "1", as mentioned previously, and in this case the second flag latch 22(2) is set to "1" (the first flag latch 22(1) retains "1"). As the image data shift operation proceeds in this state, the second local memories 2(1) and 2(2) are written concurrently, i.e., simultaneous writing for the overlapped portion.

In step 126, the mode signal 12 is altered to COPY-0 mode at a timing when the last pixel data on the rester to be written in the first local memory 2(1) goes through the first processor unit 20(1). The COPY-0 mode signifies that the flag latch 22($i$) is reset to "0" only when the preceding flag latch 22($i-1$) contains "0", as mentioned previously, and in this case the first flag latch 22(1) becomes "0" and the second flag latch 22(2) retains "1". As the image data shift operation proceeds in this state, only the second local memory 2(2) is written selectively.

These operations of steps 124, 125 and 126 are repeated, with above wordings "first" and "second" being replaced with "(i−1)-th" and "i-th", respectively, while advancing the value of i until a complete rester is written up to the m-th processor unit 20($m$). Step 127 tests the end of distribution of the whole image data, and the process is terminated if the test result indicates the completion of data distribution, otherwise the sequence goes back to step 122.

In this way, image data of the following rasters are written successively.

In the case of one-dimensional area division, distribution of all partial image sections completes here, while in the case of two-dimensional area division, the mode signal control for the vertical direction takes place in the same manner as for the horizontal direction described above.

Figure 13:
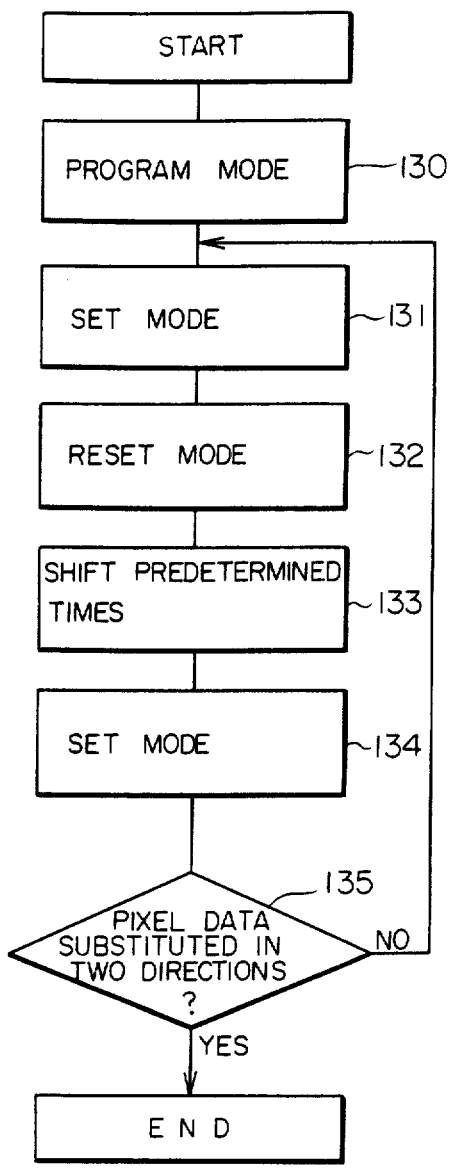
FIG. 13 is a flowchart showing the operation in divided area mode of data replacement for an abnormal portion.

Next, the method of replacing abnormal portions in divided area mode will be described with reference to FIG. 13.

Initially, in step 130, all processor elements 3 are loaded with programs each reads and then writes the local memory 2 by incrementing the address, and then the program are initiated In the subsequent step 131, the mode signal 12 is altered to SET mode so that all flag latches 22 are set to "1", and the local memories 2 are read out to all processor elements 3 In step 132, the mode signal 12 is altered to RESET mode so that all flag latches 22 are restored to "0" (The write operation of the processor elements 3 is kept active ).

In step 133, the ring bus 1 is shifted certain number of times (determined from the logical two-dimensional arrangement of processor units and logical two-dimensional transfer direction). In step 134, the mode signal 12 is altered to SET mode so that all flag latches 22 are set to "1" again. Consequently, the transferred data is written in the local memory 2 by the write operation of the processor unit 3, and replacement for one pixel completes.

Figure 10:
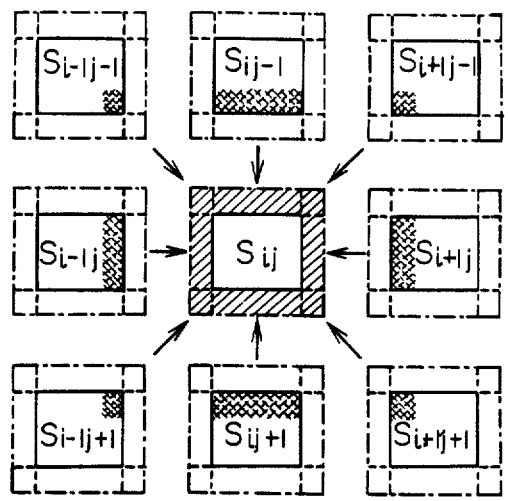
FIGS. 10A and 10B are diagrams showing the relation between adjoining partial image sections and image data to be transferred.
Figure 10B:
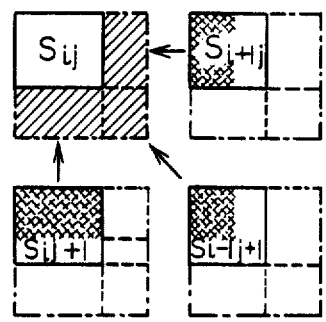

The sequence goes back to step 131 and repeats the same operations certain number of times (number of pixels determined as a product of the overlapped width and the width of a partial image section, see FIG. 10). Replacement of the pixel data for one direction is then completed.

The next step 135 tests the end of pixel data replacement for two directions, and terminates the process if the test result indicates the completion of data replacement, otherwise the number of ring bus shifts set in the ring bus controller 8 is modified and the operations from step 131 to step 134 are carried out again.

Replacements for two directions are now completed, and these operations suffice the whole data transfer needed by the type of three-directional transfer, and the third cycle of transfer operation is unnecessary. The reason is that (for the case of a leftward transfer followed by an upward transfer) the normal data for $S_{i+1, j+1}$ shown in FIG. 10B has been transferred to $S_{i, j+1}$ at the first replacement, and the data can be transferred together with the normal data in $S_{i, j+1}$ to $S_{ij}$ in the second transfer.

As will be appreciated from the foregoing description, replacement of abnormal portions in divided area mode can be carried out in parallel by all processor units using the ring bus 1, and therefore it can be completed in a short time irrespective of the number of processor units 3.

Loading of the same image into several processor units 3 can also be carried out quickly by the similar control method in which the only requirement is to place the image data on the ring bus 1.

The inventive multiprocessor system allows fast data transaction among processors, whereby the system processing speed can be enhanced significantly. Because of its one-dimensional connection among processors, the system is less complex and therefore practical. Disposition of the processor ring bus between processors and associated local memories enables a variety of operating modes, and moreover simplifies and speeds up operations such as synchronization between the data flow and the processor operation and generation of memory address.

We claim:

1. A multiprocessor system for processing in parallel data of a plurality of partial areas into which data placed in a multidimensional coordinate space is divided, the system comprising:

a plurality of processor elements each for performing, in parallel, a specified selected process on the data of a partial area, each processor element being assigned to a predetermined one of said partial areas;

a plurality of local memories for storing data to be processed by said processor elements, each of said local memories being assigned to a different one of said processor elements;

a plurality of path controllers each connected to a different one of said local memories and the processor element assigned to that local memory, and each path controller including a data latch for latching therein data from an associated local memory and means for selectively transferring data to said data latch, said associated processor element or said associated local memory from a data latch of a preceding path controller, said associated processor element or said associated local memory in accordance with a control signal from said associated processor element, said data latches in the respective path controllers being connected in series with one another in a shift register fashion for latching transferred data; and control means connected to said data latches for controlling a number of shifts for data along said data latches in said series connection.

2. A multiprocessor system for processing in parallel data of a plurality of partial areas, which data is formed by dividing data arranged in a multi-dimensional coordinate space into said plurality of partial areas, the system comprising:

a plurality of processor elements each for performing parallel processing of the data of a respective one of said plurality of partial areas;

a plurality of local memories respectively assigned to respective ones of said plurality of processor elements for storing the data to be processed by said processor elements;

a plurality of path controllers each connected to a respective one of said local memories and to a respective one of said processor elements and including a data latch, the data latches of said respective path controllers being connected in series in a shift register fashion and each of said data latches latching the data from a corresponding one of said local memories, and means for selectively transferring the data from the data latch of a preceding path controller to the data latch or to said corresponding local memory in accordance with a control signal from a corresponding one of said processor elements; and control means connected to said data latches for controlling a number of shifts for data flowing along said data latches connected in series.

3. A multiprocessor system according to claim 2, wherein each of said path controllers further includes a flag latch and a flag controller, the flag latches of said path controllers being connected in series in a shift register fashion for controlling the operation of their associated processor elements, and wherein the flag controller in each of said path controllers is connected to the flag latch of said path controller and to the flag latch of the path controller of the preceding stage to receive output signals from the two flag latches and is further connected to receive a mode signal provided by said control means for producing, on the basis of said output signals of the two flag latches and said mode signal, a signal which determines the state of the flag latch of that path controller.

4. A multiprocessor system according to claim 10, wherein said mode signal has a first mode in which said flag latches have their states unchanged, a second mode in which said flag latches are reset, a third mode in which said flag latches are set, a fourth mode in which said flag controllers reset said flag latches only when the preceding-stage flag latches are in their reset states, and a firth mode in which said flag controllers set the flag latches only when said preceding-stage flag latches are in their set states.

5. A multiprocessor system according to claim 2, wherein said transferring means in each of said path controllers includes switching means in connection with a corresponding one of said processor elements and said data latch and a corresponding one of said local memories for switching the transfer direction of transferred data.

6. A multiprocessor system according to claim 5, wherein said switching means comprises a decoder and a plurality of gates which determine the data transfer direction, said decoder receiving an address signal, a read signal and a write signal provided by said processor element and producing signals which determine an enabled or disabled state of said gates in accordance with a combination of said received signals, so that transferred data flows through gates enabled by said produced signals.

7. A multiprocessor system according to claim 2, wherein said control means determines the number of shifts under control by a microprocessor.

8. A multiprocessor system for processing in parallel data of a plurality of partial areas into which data placed in a multidimensional coordinate space is divided, the system comprising:

a plurality of processor elements each for performing, in parallel, a specified selected process on the data of a partial area, each processor element being assigned to a predetermined one of said partial areas;

a plurality of local memories for storing data to be processed by said processor elements, each of said local memories being assigned to a different one of said processor elements;

a plurality of path controllers each connected to a different one of said local memories and the processor element assigned to that local memory, and each path controller including a data latch for latching therein at least one of data from an associated local memory, data from an associated processor element and data from the latch of a preceding path controller and means for selectively transferring data to said data latch, said associated processor element or said associated local memory from a data latch of said preceding path controller, said associated processor element or said associated local memory in accordance with a control signal from said associated processor element, said data latches in the respective path controllers being connected in series with one another in a shift register fashion for latching transferred data; and control means connected to said series connection of data latches for supplying said data latches with a shift clock pulse to control a number of shifts for data along said data latches in said series connection.

9. A multiprocessor system for processing in parallel data of a plurality of partial areas, which data is formed by dividing data arranged in a multi-dimensional coordinate space into said plurality of partial areas, the system comprising:

a plurality of processor elements each for performing parallel processing of the data of a respective one of said plurality of partial areas;

a plurality of local memories respectively assigned to respective ones of said plurality of processor elements for storing the data to be processed by said processor elements;

a plurality of path controllers each connected between a respective one of said local memories and a respective one of said processor elements and including a data latch, the data latches of said respective path controllers being connected in series in a shift register fashion and each of said data latches latching at least one of the data from a corresponding one of said local memories and the data from the data latch of a preceding path controller, an means for transferring the data from the data latch of a preceding path controller to the data latch or to said corresponding local memory in accordance with a control signal from a corresponding one of said processor elements; and control means connected to said series connection of data latches for supplying said data latches with a shift clock pulse to control a number of shifts for data flowing along said data latches connected in series.

10. A multiprocessor system according to claim 9, wherein each of said path controllers further includes a flag latch and a flag controller, the flag latches of said path controller being connected in series in a shift register fashion for controlling the operation of their associated processor elements, and wherein the flag controller in each of said path controllers is connected to the flag latch of said path controller and to the flag latch of the path controller of the preceding stage to receive output signals from the two flag latches and is further connected to receive a mode signal provided by said control means for producing, on the basis of said output signals of the two flag latches and said mode signal, a signal which determines the state of the flag latch of that path controller under consideration.

11. A multiprocessor system according to claim 10, wherein said mode signal has a first mode in which said flag latches have their states unchanged, a second mode in which said flag latches are reset, a third mode in which said flag latches are set, a fourth mode in which said flag controllers reset said flag latches only when the preceding-stage flag latches are in their reset states, and a fifth mode in which said flag controllers set the flag latches only when said preceding-stage flag latches are in their set states.

12. A multiprocessor system for processing in parallel data of a plurality of partial areas into which data placed in a multidimensional coordinate space is divided, the system comprising:

a plurality of processor elements each for performing, in parallel, a specified selected process on the data of a partial area, each processor element being assigned to a predetermined one of said partial areas;

a plurality of local memories for storing data to be processed by said processor elements, each of said local memories being assigned to a different one of said processor elements;

a plurality of path controllers each connected to a different one of said local memories and the processor element assigned to that local memory, and each path controller including a data latch for latching therein data from an associated local memory and means for selectively transferring data to said data latch, and directly to one of said associated processor elements and said associated local memories without storing the data in said associated data latch, from a data latch of a preceding path controller, said associated processor element or said associated local memory in accordance with a control signal from said associated processor element, said data latches in the respective path controllers being connected in series with one another in a shift register fashion for latching transferred data; and control means connected to said data latches for controlling a number of shifts for data along said data latches in aid series connection.

13. A multiprocessor system for processing in parallel data of a plurality of partial areas, which data is formed by dividing data arranged in a multi-dimensional coordinate space into said plurality of partial areas, the system comprising:

a plurality of processor elements each for performing parallel processing of the data of a respective one of said plurality of partial areas;

a plurality of local memories respectively assigned to respective ones of said plurality of processor elements for storing the data to be processed by said processor elements;

a plurality of path controllers each connected to a respective one of said local memories and to a respective one of said processor elements and including a data latch, the data latches of said respective path controllers being connected in series in a shift register fashion and each of said data latches latching the data from a corresponding one of said local memories, and means for selectively transferring the data from the data latch of a preceding path controller to the data latch and directly to one of said associated processor elements and said associated local memories without storing the data in said associated data latch, in accordance with a control signal from a corresponding one of said processor elements; and control means connected to said data latches for controlling a number of shifts for data flowing along said data latches connected in series.

* * * * *